United States Patent [19]

Zaunberger et al.

[11] Patent Number: 4,674,350
[45] Date of Patent: Jun. 23, 1987

[54] DEFLECTION COMPENSATING GEAR SYSTEM WITH RADIALLY DISPLACEABLE RING GEAR

[75] Inventors: Franz-Xaver Zaunberger; Artur Kugler, both of Augsburg, Fed. Rep. of Germany

[73] Assignee: Zahnraderfabrik Renk, AG, Augsburg, Fed. Rep. of Germany

[21] Appl. No.: 735,975

[22] Filed: May 20, 1985

[30] Foreign Application Priority Data

May 23, 1984 [DE] Fed. Rep. of Germany ....... 3419194

[51] Int. Cl.⁴ ...................... F16H 55/17; F16H 35/08
[52] U.S. Cl. ........................................ 74/438; 74/410; 74/411; 74/402
[58] Field of Search ................. 74/438, 410, 411, 398, 74/399, 402, 403

[56] References Cited

U.S. PATENT DOCUMENTS

| | | | |
|---|---|---|---|
| 2,380,113 | 7/1945 | Kuhns | 74/410 |
| 3,192,790 | 7/1965 | Endress | 74/410 |
| 3,213,713 | 10/1965 | Sagara | 74/410 |
| 3,244,020 | 4/1966 | Breuer | 74/410 |
| 3,289,488 | 12/1966 | Breuer | 74/410 |
| 3,309,936 | 3/1967 | Gaubis | 74/410 |
| 3,352,178 | 11/1967 | Lindgren et al. | 74/410 |
| 3,381,548 | 5/1968 | Walkenstein | 74/410 |
| 3,424,035 | 1/1969 | Heidrich | 74/410 |
| 3,434,374 | 3/1969 | Barwig et al. | 74/410 |
| 3,530,733 | 9/1970 | Heidrich | 74/410 |
| 3,534,624 | 10/1970 | Durinck | 74/410 |
| 3,563,105 | 2/1971 | Graziosi | 74/410 |
| 3,678,775 | 7/1972 | Danielsson | 74/410 |
| 3,839,922 | 10/1974 | Hiersig et al. | 74/410 |
| 3,889,334 | 6/1975 | Justus . | |
| 3,924,485 | 12/1975 | Caldwell et al. | 74/410 |
| 4,158,967 | 6/1979 | Vatterott | 74/410 |
| 4,399,719 | 8/1983 | Chszaniecki et al. | 74/410 |
| 4,467,666 | 8/1984 | Ackermann | 74/410 |

FOREIGN PATENT DOCUMENTS 2103190 8/1971 Fed. Rep. of Germany .
2817106 11/1978 Fed. Rep. of Germany .

OTHER PUBLICATIONS

Maschinenbautechnik 31 (1982 12) pp. 561–564.

Primary Examiner—Lawrence Staab
Attorney, Agent, or Firm—Natter & Natter

[57] ABSTRACT

A gear system includes a housing and an intermediate ring gear movably carried on a support hub coupled to an output shaft. The ring gear is driven by an input pinion gear through a running tooth system and drives the support hub through a coupling tooth system. Misalignment of the gearings due to housing, shaft or support deflections under load are compensated by providing an arcuate axial tooth profile and radial clearance in the coupling tooth system. The coupling tooth system includes lubricant confined between a pair of sealing discs. In an alternate embodiment, the ring gear is carried on spherically configured rings of the support and the ring gear includes mating spherically configured rings with suitable clearance between the spherical surfaces. Engagement between the mating spherical surfaces generates the radial force required for adjustment of the ring gear while maintaining radial tooth clearance within the coupling tooth system. As a result, the coupling tooth system transmits torque forces exclusively.

17 Claims, 3 Drawing Figures

DEFLECTION COMPENSATING GEAR SYSTEM WITH RADIALLY DISPLACEABLE RING GEAR

TECHNICAL FIELD

The present invention relates generally to spur gear trains and more particularly to a gear train assembly which compensates for axial deflections due to deformation of housings or shafts.

BACKGROUND ART

One of the problems encountered with prior spur gear trains operating under load under conditions wherein high radial forces were encountered resulted from shaft deflections and deformations of the housings carrying the gear trains. Such deformations caused malfunctions at tooth engagement due to mutual offset or interference of teeth and produced excessive wear, reduced torque transmission and power loss.

In order to avoid such interference and malfunctions which reduced transmission life and increased load losses, transmissions were employed which were oversized relative to the actual running speeds and torque loads. Not only was this an impractical solution in terms of the transmission cost itself but, in addition, it presented unnecessary continuous no load power losses on the transmission system and thereby decreased operating system efficiencies.

DISCLOSURE OF THE INVENTION

In compendium, the present invention comprises a self-compensating gear system having an input gear and a driven gear coupled to an output shaft. An intermediate ring gear is movably carried on a support hub which includes the driven gear. The ring gear is driven by the input gear through a running tooth system and drives the output gear through a coupling tooth system.

To compensate for deflections of the output shaft, the housing and the gearings due to high radial forces, radial clearance is provided in the coupling tooth system to permit adjustable movement of the ring gear. In addition, axial misalignment of the gearings is also compensated by providing an arcuate, i.e. barrel shaped, axial tooth profile in the coupling tooth system.

Because the radial separating force of the running tooth system is greater than the radial centering force of the coupling tooth system, the ring gear is displaced relative to the center of the support within the limits of the tooth clearance of the coupling tooth system. The peripheral force is transmitted in the coupling tooth system only by a tooth segment lying opposite the point of engagement of the running tooth system. As a result the force required for adjustment of the ring gear is minimized.

A further embodiment of the gear system includes spherically configured rings on the support hub adjacent the teeth of the driven gear and mating spherical surfaces fixed to the ring gear. Suitable clearance is provided between the spherical surfaces. The ring gear is permitted to be axially displaced within the spherical surface clearance, and contact at the spherical surfaces provides the radial force required for adjustment of the ring gear while maintaining radial clearance within the coupling tooth system. The coupling tooth system thus transmits torque forces exclusively and is not required to provide the radial force necessary for adjusting the ring gear.

In order to reduce the forces which affect the position of the gears and provide long term stability of the tooth couplings as well as the mating spherical surfaces (if employed), a lubricating oil is supplied to the coupling tooth system. Sealing discs are provided on both sides of the coupling tooth system to confine the lubricating oil which, due to centrifugal force, forms an oil ring continuously enveloping and lubricating the coupling tooth system and, if present, the spherical surfaces.

In a further embodiment, the driven gear comprises an innal gear and the coupling tooth system includes reduced diameter arcuate tips along the axial tooth profile of the external ring gaer teeth.

From the foregoing summary, it will be appreciated that it is an aspect of the present invention to provide a deflection compensating gear system of the general character described which is not subject to the disadvantages of the background art aforementioned.

A further aspect of the present invention is to provide a deflection compensating gear system of the general character described which is relatively low in cost yet capable of operating under sustained high speed conditions with high torque loads.

A further consideration of the present invention is to provide a deflection compensating gear system wherein deformations of a gear train housing have no adverse effect upon the torque transmission.

A further feature of the present invention is to provide a deflection compensating gear system wherein axial misalignment of gears will not result in tooth interference.

A further feature of the present invention is to provide a deflection compensating gear system of the general character described which is efficient and capable of economical low cost mass production fabrication.

Yet another aspect of the present invention is to provide a deflection compensating gear system of the general character described which is capable of continued operation in the presence of dynamic shaft deformations.

An additional consideration of the present invention is to provide a deflection compensating gear system of the general character described which includes a radially displaceable ring gear for providing compensation for axial misalignment.

Another feature of the present invention is to provide a self-compensating gear system of the general character described which includes a coupling tooth system having arcuate axial tooth profiles for axial deflection compensation.

Yet another feature of the present invention is to provide a deflection compensating gear system of the general character described which includes a radially displaceable ring gear carried on a support and mating spherical surface on the support and the ring gear for providing radial forces necessary to axially adjust the ring gear.

Other features, advantages and aspects of the present invention in part will be obvious and in part will be pointed out hereinafter.

With these features, aspects and considerations in mind, the invention finds embodiment in various combinations of elements and arrangements of parts by which the invention is achieved, all with reference to the accompanying drawings and the scope of which is more particularly pointed cut and indicated in the appended claims.

BRIEF DESCRIPTION OF THE DRAWINGS

With reference to the accompanying drawings wherein some of the various possible exemplary embodiments of the invetnion are shown.

FIG. is a schematized fragmentary axial sectional view through a deflection compensating gear system constructed in accordance with and embodying the invention and showing a movable ring gear carried on a support hub which includes a driven gear having an arcuate axial tooth profile.

DESCRIPTION OF THE PREFERRED EMBODIMENTS

Figure 1:
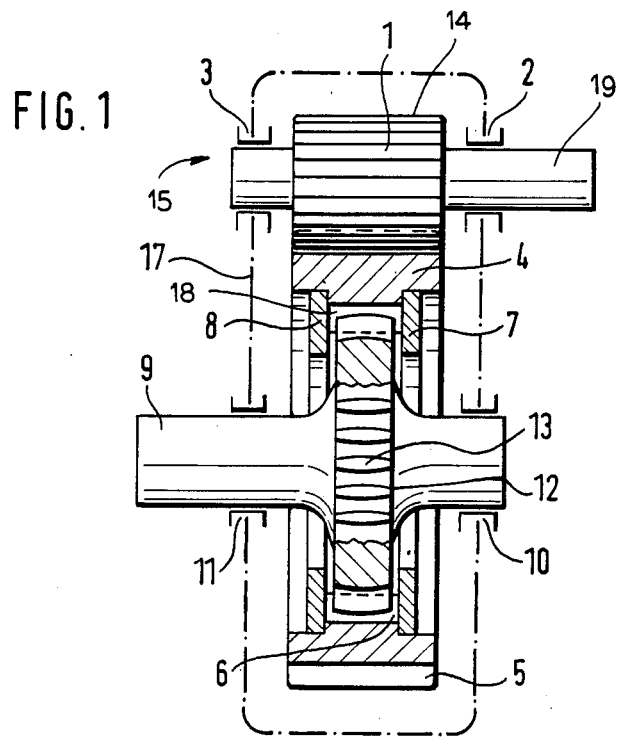

Referring now in detail to FIG. 1 of the drawings, the reference numeral 15 denotes generally a deflection compensating gear system constructed in accordance with and embodying the invention and carried in a housing 17. The gear system 15 includes an input shaft 19 journalled for rotation through a pair of bearings 2, 3 which are seated within apertures of the housing 17. An input pinion 1 is formed of a spur gear fixed to the input shaft 19 and includes a plurality of teeth 14.

The gear system 15 further includes a movable ring gear 4 having a plurality of external teeth 5 and a plurality of internal teeth 6. The ring gear is driven by engagement between the input pinion teeth 14 and the ring gear external teeth 5. Such toothed interrelationship shall hereinafter be referred to as a running tooth system and designated by the reference numeral 16.

The gear system 15 also includes an output shaft 9 journalled for rotation through a pair of bearings 10, 11 which are seated within suitable apertures formed in the housing 17. The output shaft 9 includes an enlarged support hub 12 having a plurality of spur gear teeth 13 formed along its circumference. The support hub 12 and the teeth 13 are driven by the internal teeth 6 of the ring gear 4 and may be considered a driven gear.

The toothed interengagement between the internal teeth 6 of the ring gear 4 and the external teeth 13 of the driven gear will be referred to as a coupling tooth system 18.

Pursuant to the invention, the ring gear 4 is movably carried by the support hub 12 and is radially displaceable relative to the axis of the support hub 12 and its shaft 9. In addition, the axial profile of at least one set of teeth in the coupling tooth system 18, for example the driven gear teeth 13, are arcuate, i.e Due to the spherieal sector configuration of the teeth 13, the teeth 13 of the driven gear are laterally offsettable relative to the output shaft 9 and support hub 12 without encountering interference with the internal teeth 6 of the ring gear 4. Thus, output shaft or housing deflections due to high running radial forces will not impede tooth engagement.

By appropriate tooth dimensions with respect to engagement angle, the teeth 6, 13 of the coupling tooth system 18 are configured so that the separating force of the running tooth system 16, i.e. the radial force component urging the ring gear 4 away from the axis of the input shaft 19 is greater than the centering force of the coupling tooth system 18, i.e. the radial force component due to interengagement of the teeth 6, 13 and urging the ring gear 4 in a radial direction opposite to the separating force.

As a result, under a state of load the ring gear is radially displaced relative to the center of the output shaft 9 a distance limited by the clearance between the top and bottom lands of the teeth 6, 13 respectively. The peripheral force is transmitted only by a tooth segment lying opposite the point of engagement of the running tooth system 16 and thus the force required for adjusting the ring gear 4 is minimized. In addition, the teeth 6, 13 of the coupling tooth system 18 are preferably dimensioned so that by elastic deformation of the teeth in the force transmitting segment region of interengagement, a sufficient number of teeth 6, 13 concurrently participate in torque transmission. Such number is minimized in the region of the running tooth system.

It should be noted that in accordance with the invention it is desirable to maintain continuous lubrication within the coupling tooth system 18. For this purpose a pair of annular sealing discs 7, 8 are secured to the ring gear 4 adjacent the opposite sides of the internal teeth 6. The annular sealing discs 7, 8 preferably extend toward the center of the support hub 12 at least a distance equal to the depth of the teeth 13 to thereby confine a lubricant within the coupling tooth system 18 and maintain an oil ring.

Figure 2:
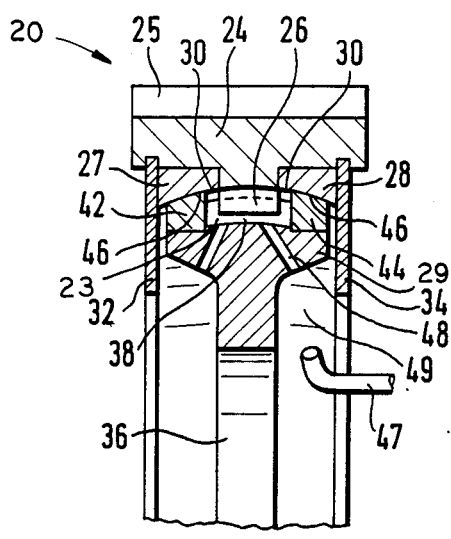
FIG. 2 is a fragmentary axial sectional view through an alternate embodiment of the invention with portions deleted and showing a ring gear and wherein a support hub includes spherical surfaces and the ring gear includes mating spherical surfaces for providing radial forces required to axially adjust the ring gear.

Attention is now directed to FIG. 2 wherein an alternate. embodiment of the invention is shown. This embodiment is similar in configuration to the embodiment previously disclosed and with the drawing omitting portions of the gear system previously disclosed. The reference numeral 20 denotes generally a gear system constructed in accordance with the alternate embodiment. The gear system 20 includes a movable ring gear 24 similar in configuration to the ring gear 4 previously described. The ring gear 24 includes a plurality of external teeth 25 and a plurality of internal teeth 26. Engagement between a drive pinion (not shown) and the external teeth 25 of a running tooth system drives the ring gear.

The gear system 20 also includes a support hub 36 to which is joined an output shaft (not shown). Adjacent the periphery of the support hub 36, a wide web 29 is formed with the web having a plurality of spur gear teeth 38. The support hub 36 is driven by engagement between the teeth 38 and internal teeth 26 formed on the ring gear 24. In a manner similar to that previously described with reference to the prior embodiment, the ring gear 24 is movably carried by the support hub 36 and is radially displaceable about the axis of the support hub.

The tooth engagement between the ring gear teeth 26 and the support hub teeth 38 may be considered a coupling tooth system 23. In accordance with the invention at least one set of teeth of the coupling tooth system 23, for example the support hub teeth 38, are arcuate in axial profile.

The gear system 20 of the present embodiment differs from the gear system 15 of the prior embodiment in that the axial width of the teeth 38 is less than the axial width of the web 29 of the support hub 36. Positioned on the web 29 and extending on both sides of the teeth 38 are a pair of guide rings 42, 44. Similarly positioned on the ring gear 24 are a pair of guide rings 27, 28.

The support guide rings 42, 44 include convex spherical surfaces 46 which may be configured with the same radius of curvature as the arcuate tooth profile of the teeth 38. The convex spherical surfaces 46 engage mating concave spherical surfaces 30 formed on the ring gear guide rings 27, 28. It should be appreciated, however, that the diameter of the concave spherical surfaces 30 is slightly greater than the diameter of the convex spherical surfaces 46 to provide appropriate clearance so that the ring gear 24 with the guide rings 27, 28 can shift axially relative to the axis of the support hub 36 in accordance with the invention.

The ring gear 24 will thus be axially displaced within the limits of the spherical surface clearance and contact between the spherical surfaces 46, 30 provides the radial force required for adjustment of the ring gear. The clearance between the spherical surfaces 46, 30 is less than the clearance between the top and bottom lands of the teeth 26, 38 of the coupling tooth system 23 so that the teeth of the coupling tooth system 23 will not be required to generate radial forces during adjustment of the ring gear 24. As a result, the coupling tooth system 23 will transmit torque forces exclusively.

It should be additionally noted that the gear system 20 also includes a pair of annular sealing discs 32, 34 secured to the ring gear 24 on opposite sides of the guide rings 27, 28 and seated in grooves formed in the ring gear. The sealing discs 32, 34 provide, as with the previous embodiment, an appropriate lubrication confining area 49 to assure proper lubrication of the coupling tooth system 23. In addition, the sealing discs provide proper lubrication confinement for assuring that the guide ring spherical surfaces are also appropriately lubricated with a continuous oil ring.

In order to improve lubrication of the coupling tooth system 23 and spherical surfaces 46, 30, the gear system 20 includes an oil feed nozzle 47 which introduces appropriate lubricating oil into the lubricant confining area 49. In addition, the wide web 29 of the support hub 36 includes suitable oil flow passages 48 to provide oil flow from the confining area 49 to the bottom lands of the teeth 38. Centrifugal force thus assures forced lubrication directly into the coupling tooth system 23. Such forced lubrication also provides suitable lubrication between the spherical surfaces 46, 30 of the guide rings. It should also be noted that the lubricant confining area 49 extends between the sealing discs 32, 34 and the side edges of both the enlarged web 29 and the support hub guide rings 42, 44 to assure proper lubrication of the spherical surfaces 46, 30.

Figure 3:
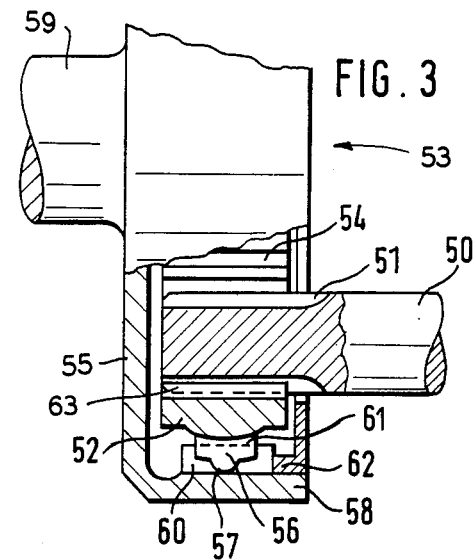
FIG. 3 is a fragmentary sectional view through a further embodiment of the invention wherein the support comprises an internally toothed gear.

A still further embodiment of the invention is illustrated in FIG. 3. In this embodiment a gear system 53 includes a support hub which carries an internal gear. An input pinion 50 having spur teeth 51 engages internal teeth 54 of a ring gear 52 to provide a running tooth system 63 for driving the ring gear 52. In a manner similar to that described with respect to the prior embodiments, the ring gear 52 is movable.

The ring gear 52 includes external teeth 56 which engage internal teeth 60 of a support hub 55 having an output shaft 59. The external ring gear teeth 56, in engagement with the internal support hub teeth 60, comprise a coupling tooth system 61.

As described with reference to the first embodiment, the ring gear 52 is radially displaceable relative to the output shaft 59 due to the clearance between the top and bottom lands of the teeth 56, 60. Additionally, at least one set of teeth of the coupling tooth system 61 includes an arcuate configuration. It should be noted in this regard that arcuate projections 57 are formed on the tips of the top lands of the external ring gear teeth 56 and the displacement of the ring gear 52 is limited by the clearance between the projections 57 and the bottom lands of the teeth 60.

Thus, it will be seen that there is provided a deflection compensating gear system with radially displaceable ring gear which achieves the various features and aspects of the invention and which is well suited to meet the conditions of practical usage As various modifications might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A deflection compensating high performance spur gear train system, the system including at least two interengaged gears, one of the gears comprising a ring gear, the ring gear having a rim, the rim comprising a running tooth system, support means for carrying the ring gear, gear coupling means interconnecting ring gear and the support means, the gear coupling means comprising a coupling tooth system, the ring gear being radially displaceable, the running tooth system generating a radial separating force under load, the coupling tooth system generating a radial centering force under load in a direction opposite to that of the separating force, the means for generating the centering force including means dimensioning the gear coupling means with respect to its engagement angle and means providing opposed circumferential face interengagement associated with the gear coupling means so that the separating force of the running tooth system is greater than the centering force of the coupling tooth system, the interengagement means including means for absorption of radial forces, the absorption means comprising means forming a spherical sector shaped centering area between the ring gear and the support means.

2. A deflection compensating high performance spur gear train system constructed in accordance with claim 1 wherein the ring gear includes means forming two spherical sector shaped areas and the support means includes means forming two spherical sector shaped areas, each of the ring gear spherical shaped areas mating with one of the support spherical sector shaped areas, the mating spherical sector shaped areas being positioned axially adjacent and on each side of the coupling tooth system.

3. A deflection compensating high performance spur gear train system constructed in accordance with claim 1 wherein the coupling tooth system includes a first set of teeth associated with the ring gear and a second set of teeth associated with the support means, at least one of the sets of teeth in the coupling tooth system having an arcuate axial profile the spherical sector shaped area comprising the arcuate profile.

4. A deflection compensating high performance spur gear train system constructed in accordance with claim 3 wherein the teeth of the sets of teeth have top lands and bottom lands, the arcuate profile being formed on the top lands of one set of teeth, the arcuate top lands engaging the bottom lands of the other set of teeth to provide the opposed circumferential face interengagement.

5. A deflection compensating high performance spur gear train system constructed in accordance with claim 1 wherein the ring gear includes means forming a spherical sector shaped area and the support includes means forming a mating spherical sector shaped area, the spherical sector shaped areas being positioned axially adjacent the coupling tooth system.

6. A deflection compensating high performance spur gear train system constructed in accordance with claim 5 wherein the spherical sector shaped areas associated with the ring gear are concave and the spherical sector shaped areas associated with the support means are convex, the concave spherical sector shaped areas having an axial diameter greater than that of the convex spherical sector shaped areas whereby an appropriate clearance is provided for adjustable axial movement of the ring gear.

7. A deflection compensating high performance spur gear train system constructed in accordance with claim 6 wherein the clearance between the spherical shaped areas permits radial displacement of the ring gear relative to the support means so that only a minimum number of teeth of the coupling tooth system are required for torque transmission in a zone of the coupling tooth system adjacent the running tooth system.

8. A deflection compensating high performance spur gear train system constructed in accordance with claim 1 wherein radial clearance is provided between the gear teeth of the coupling tooth system, the radial clearance being so dimensioned such that through eccentric displacement of the ring gear, a minimum number of teeth of the coupling tooth system are required to participate in torque transmission in a zone of the coupling tooth system which is adjacent the running tooth system.

9. A deflection compensating high performance spur gear train system constructed in accordance with claim 1 further including means forming arcuate projections on the tips of the top lands of the one set of teeth in the coupling tooth system.

10. A deflection compensating high performance spur gear train system constructed in accordance with claim 1 further including a pair of gear train sealing discs, the sealing discs being positioned adjacent the coupling tooth system, the sealing discs confining a lubricant within the coupling tooth system whereby an oil ring is provided for lubricating the coupling tooth system under centrifugal force during operation of the gear train system.

11. A deflection compensating high performance spur gear train system constructed in accordance with claim 1 wherein the ring gear is of larger diameter than the other gear.

12. A deflection compensating high performance spur gear train system, the system including at least two interengaged gears, one of the gears comprising a ring gear, the ring gear having a rim, the rim comprising a running tooth system, support means for carrying the ring gear, gear coupling means interconnecting ring gear and the support means, the gear coupling means comprising a coupling tooth system, the ring gear being radially displaceable, the running tooth system generating radial separating force under load, the coupling tooth system generating a radial centering force under load in a direction opposite to that of the separating force, the means for generating the centering force including means dimensioning the gear coupling means with respect to its engagement angle and means providing opposed circumferential face interengagement associated with the gear coupling means so that the separating force of the running tooth system is greater than the centering force of the coupling tooth system whereby the ring gear is adjustable displaced.

13. a deflection compensating high performance spur gear train system constructed in accordance with claim 12 wherein the coupling tooth system includes a first set of teeth associated with the ring gear and a second set of teeth associated with the support means, at least one of the sets of teeth in the coupling tooth system having an arcuate axial profile the arcuate profile comprising means for the absorption of radial forces.

14. A deflection compensating high performance spur gear train system constructed in accordance with claim 13 wherein the teeth of the sets of teeth have top lands and bottom lands, the arcuate profile being formed on the top lands of one set of teeth, the arcuate top lands engaging the bottom lands of the other set of teeth to provide the opposed peripheral face interference.

15. A deflection compensating high performance spur gear train system constructed in accordance with claim 12 further including means forming arcuate projections on the tips of the top lands of at least one set of teeth in the coupling tooth system.

16. A deflection compensating high performance spur gear train system constructed in accordance with claim 12 wherein radial clearance is provided between the gear teeth of the coupling tooth system, the radial clearance being so dimensioned such that through eccentric displacement of the ring gear, a minimum number of teeth of the coupling tooth system are required to participate in torque transmission in a zone of the coupling tooth system which is adjacent the running tooth system.

17. A deflection compensating high performance spur gear train system constructed in accordance with claim 12 further including a pair of gear train sealing discs, the sealing disc confining a lubricant within the coupling tooth system whereby a lubricant ring is provided for lubricating the coupling tooth system under centrifugal force during operation of the gear train system.

* * * * *